United States Patent
Wentink et al.

(10) Patent No.: US 9,326,137 B2
(45) Date of Patent: Apr. 26, 2016

(54) IMPLICIT REKEYING MECHANISM

(71) Applicant: QUALCOMM Incorporated, San Diego, CA (US)

(72) Inventors: Maarten Menzo Wentink, Naarden (NL); Jouni Malinen, Tuusula (FI)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 14/148,349

(22) Filed: Jan. 6, 2014

(65) Prior Publication Data
US 2014/0192985 A1    Jul. 10, 2014

Related U.S. Application Data

(60) Provisional application No. 61/749,760, filed on Jan. 7, 2013.

(51) Int. Cl.
*H04W 12/04* (2009.01)
*H04W 84/12* (2009.01)
*H04L 29/06* (2006.01)

(52) U.S. Cl.
CPC .......... *H04W 12/04* (2013.01); *H04L 63/068* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 8,713,311 | B1* | 4/2014 | Roskind | 713/161 |
| 2002/0095568 | A1* | 7/2002 | Norris et al. | 713/151 |
| 2005/0058295 | A1* | 3/2005 | Kang | 380/282 |
| 2009/0041247 | A1* | 2/2009 | Barany et al. | 380/270 |
| 2010/0005295 | A1* | 1/2010 | Chakarapani et al. | 713/168 |
| 2011/0055558 | A1* | 3/2011 | Liu et al. | 713/160 |
| 2011/0150223 | A1 | 6/2011 | Qi et al. | |

OTHER PUBLICATIONS

International Search Report and Written Opinion—PCT/US2014/010419—ISA/EPO—Apr. 9, 2014.
Kaiying L.V (ZTE Corporation): "MAC header design for small data packet for 802.11ah; 11-12-0094-03-00ah-mac-header-design-for-small-data-packet-for-802-IIah" , IEEE SA MENTOR; 11-12-0094-03-00AH-MAC-HEADER-DESIGN-FOR-S    MALL-DATA-PACKET-FOR-802-IIAH, IEEE-SA Mentor, Piscataway, NJ USA, vol . 802.11ah9 No. 3, Jan. 18, 2012, pp. 1-11, XP068038187, [retrieved on Jan. 18, 2012] p. 3-p. 8.
Merlin S., (QUALCOMM) : Short MAC header signaling ; ING, IEEE-SA Mentor, Piscataway, NJ USA, vol. 802.11ah, Sep. 17, 2012, pp. 1-12, XP068039852, [ retrieved on Sep. 17, 2012] p. 3-p. 6.
Merlin S., (QUALCOMM Inc) : "MAC header compression ; 11-12-0365-01-00ah-mac-header-compression" EEES A Mentor; 11-12-0365-01-00AH-MAC-HEADER-COMPRESSION, IEEE-SA Mentor, Piscataway, NJ USA, vol. 802.11ah9, No. 1, Mar. 15, 2012, pp. 1-9, XP068038720, [retreived on Mar. 15, 2012] p. 3-p. 4.

* cited by examiner

*Primary Examiner* — Hadi Armouche
*Assistant Examiner* — Malcolm Cribbs
(74) *Attorney, Agent, or Firm* — Patterson & Sheridan, L.L.P.

(57) ABSTRACT

Certain aspects of the present disclosure provide methods and apparatus for secure transmission of packets with short headers. The methods may include temporarily suspending the use of packets that use a short MAC header (that lack a Key ID field) during re-keying procedures and resuming the use of such packets after a new default Key ID is established via the re-keying procedures.

24 Claims, 9 Drawing Sheets

IMPLICIT REKEYING MECHANISM

CROSS-REFERENCE TO RELATED APPLICATIONS

The present patent application claims priority to U.S. Provisional Application No. 61/749,760, filed Jan. 7, 2013, assigned to the assignee of the present application and hereby expressly incorporated by reference in its entirety.

BACKGROUND

1. Field of the Invention

Certain aspects of the present disclosure generally relate to wireless communications and, more particularly, to techniques that may allow secure transmission of short packets that lack a key ID field identifying a key agreed upon between transmitting and receiving devices.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the desire for greater coverage and increased communication range, various schemes are being developed. One such scheme is the sub-1-GHz frequency range (e.g., operating in the 902-928 MHz range in the United States) being developed by the Institute of Electrical and Electronics Engineers (IEEE) 802.11ah task force. This development is driven by the desire to utilize a frequency range that has greater wireless range than other IEEE 802.11 groups and has lower obstruction losses.

SUMMARY

Certain aspects of the present disclosure provide an apparatus for wireless communications. The apparatus typically includes a receiver configured to receive short packets from a device, said short packets lacking a key ID field identifying a key agreed upon between the apparatus and the device; and a decoder configured to decode, using a first default key ID, some of the received short packets, participate in a re-keying procedure with the device, and decode, using a second default key ID established during the re-keying procedure, some of the received short packets after the re-keying procedure.

Certain aspects of the present disclosure provide an apparatus for wireless communications. The apparatus typically includes an encoder configured to encode, using a first default key ID, first short packets that lack a key ID field identifying a key agreed upon between the apparatus and a device, participate in a re-keying procedure with the device, and encode, using a second default key ID established during the re-keying procedure, second short packets that lack the key ID field after the re-keying procedure; and a transmitter configured to transmit the first and second short packets.

Certain aspects of the present disclosure provide an apparatus for wireless communications. The apparatus typically includes means for receiving short packets from a device, said short packets lacking a key ID field identifying a key agreed upon between the apparatus and the device, means for decoding, using a first default key ID, some of the received short packets, and means for participating in a re-keying procedure with the device, wherein the means for decoding is configured to decode, using a second default key ID established during the re-keying procedure, some of the received short packets after the re-keying procedure.

Certain aspects of the present disclosure provide an apparatus for wireless communications. The apparatus typically includes means for encoding, using a first default key ID, first short packets that lack a key ID field identifying a key agreed upon between the apparatus and a device, means for participating in a re-keying procedure with the device, wherein the means for encoding is configured to encode, using a second default key ID established during the re-keying procedure, second short packets that lack the key ID field after the re-keying procedure, and means for transmitting the first and second short packets.

Certain aspects of the present disclosure provide a method for wireless communications by an apparatus. The method typically includes receiving short packets from a device, said short packets lacking a key ID field identifying a key agreed upon between the apparatus and the device, decoding, using a first default key ID, some of the received short packets, participating in a re-keying procedure with the device, and decoding, using a second default key ID established during the re-keying procedure, some of the received short packets after the re-keying procedure.

Certain aspects of the present disclosure provide a method for wireless communications by an apparatus. The method typically includes encoding, using a first default key ID, first short packets that lack a key ID field identifying a key agreed upon between the apparatus and a device, participating in a re-keying procedure with the device, encoding, using a second default key ID established during the re-keying procedure, second short packets that lack the key ID field after the re-keying procedure, and transmitting the first and second short packets.

Certain aspects of the present disclosure provide a computer program product for wireless communications by an apparatus comprising a computer-readable medium having instructions stored thereon. The instructions are generally executable by one or more processors for receiving short packets from a device, said short packets lacking a key ID field identifying a key agreed upon between the apparatus and the device, decoding, using a first default key ID, some of the received short packets, participating in a re-keying procedure with the device, and decoding, using a second default key ID established during the re-keying procedure, some of the received short packets after the re-keying procedure.

Certain aspects of the present disclosure provide a computer program product for wireless communications by an apparatus comprising a computer-readable medium having instructions stored thereon. The instructions are generally executable by one or more processors for encoding, using a first default key ID, first short packets that lack a key ID field identifying a key agreed upon between the apparatus and a device, participating in a re-keying procedure with the device, encoding, using a second default key ID established during the re-keying procedure, second short packets that lack the key ID field after the re-keying procedure, and transmitting the first and second short packets.

Certain aspects of the present disclosure provide an access terminal for wireless communications. The access terminal typically includes at least one antenna, a receiver configured to receive, via the at least one antenna, short packets from a device, said short packets lacking a key ID field identifying a key agreed upon between the apparatus and the device; and a decoder configured to decode, using a first default key ID, some of the received short packets, participate in a re-keying procedure with the device, and decode, using a second default key ID established during the re-keying procedure, some of the received short packets after the re-keying procedure.

Certain aspects of the present disclosure provide an access point. The access point typically includes at least one antenna, an encoder configured to encode, using a first default key ID, first short packets that lack a key ID field identifying a key agreed upon between the apparatus and a device, participate in a re-keying procedure with the device, and encode, using a second default key ID established during the re-keying procedure, second short packets that lack the key ID field after the re-keying procedure; and a transmitter configured to transmit, via the at least one antenna, the first and second short packets.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
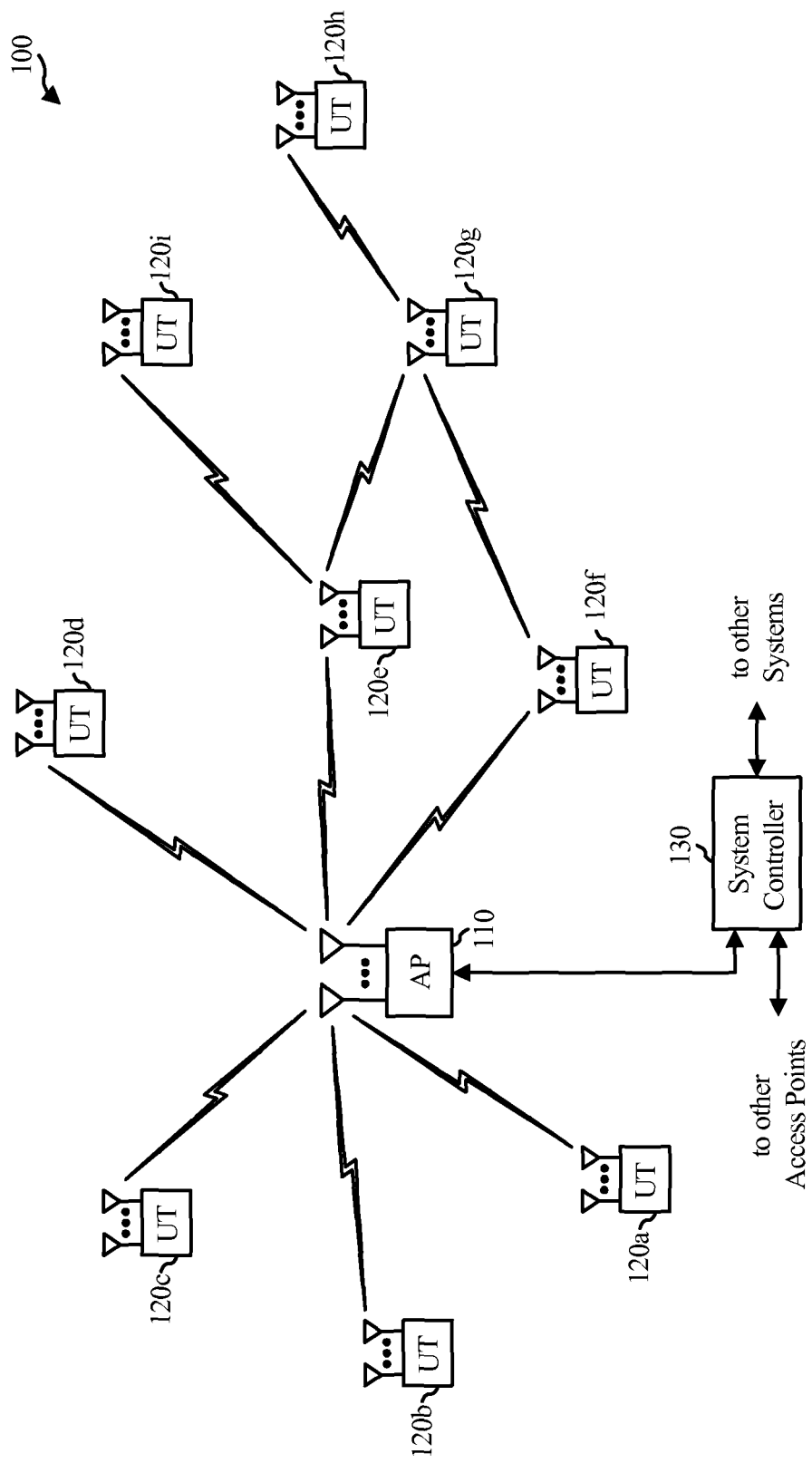
FIG. 1 illustrates a diagram of an example wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
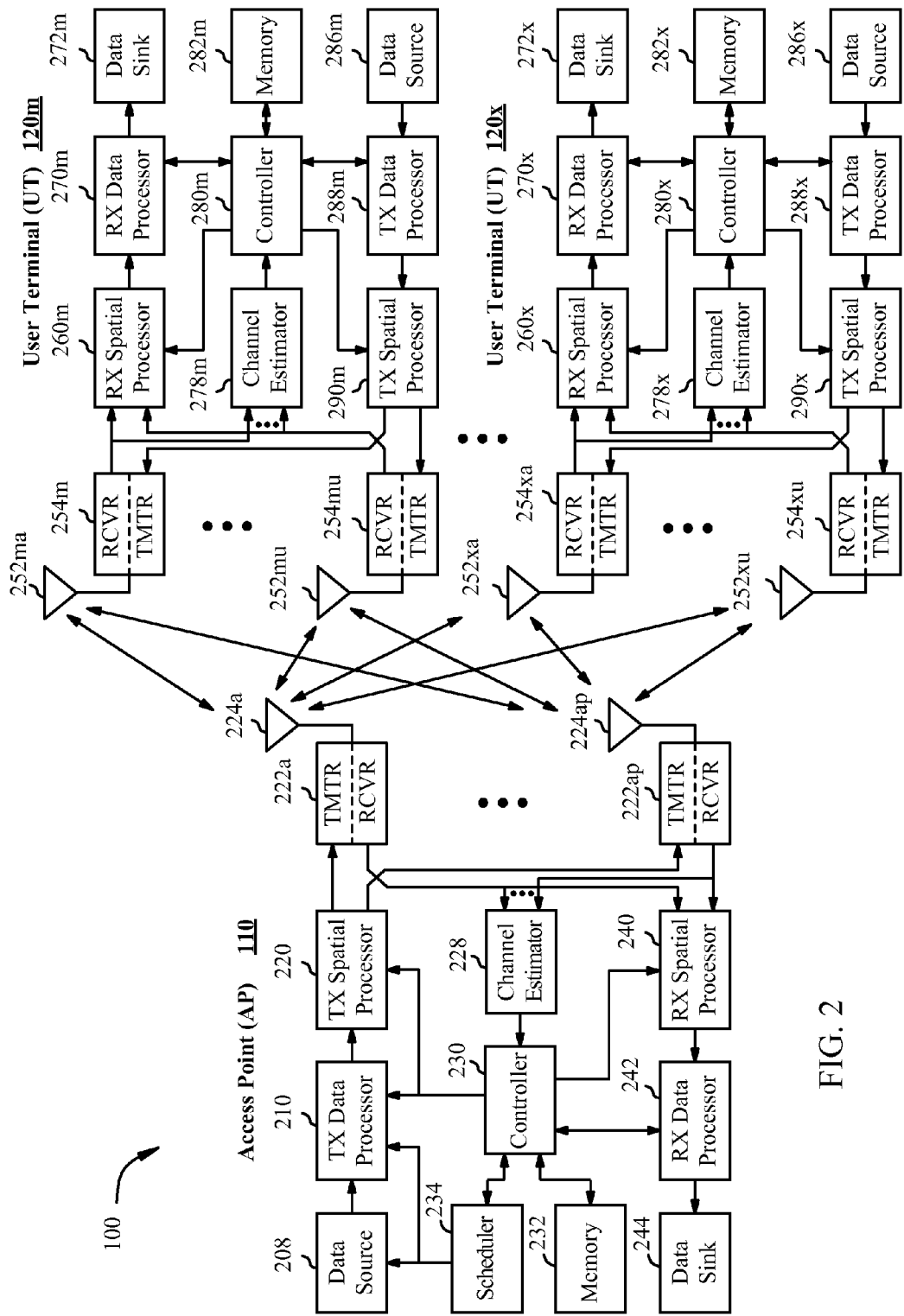
FIG. 2 illustrates a block diagram of an example access point and user terminals, in accordance with certain aspects of the present disclosure.

FIG. 2 illustrates a block diagram of access point 110 and two user terminals 120m and 120x in MIMO system 100. The access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 provide $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
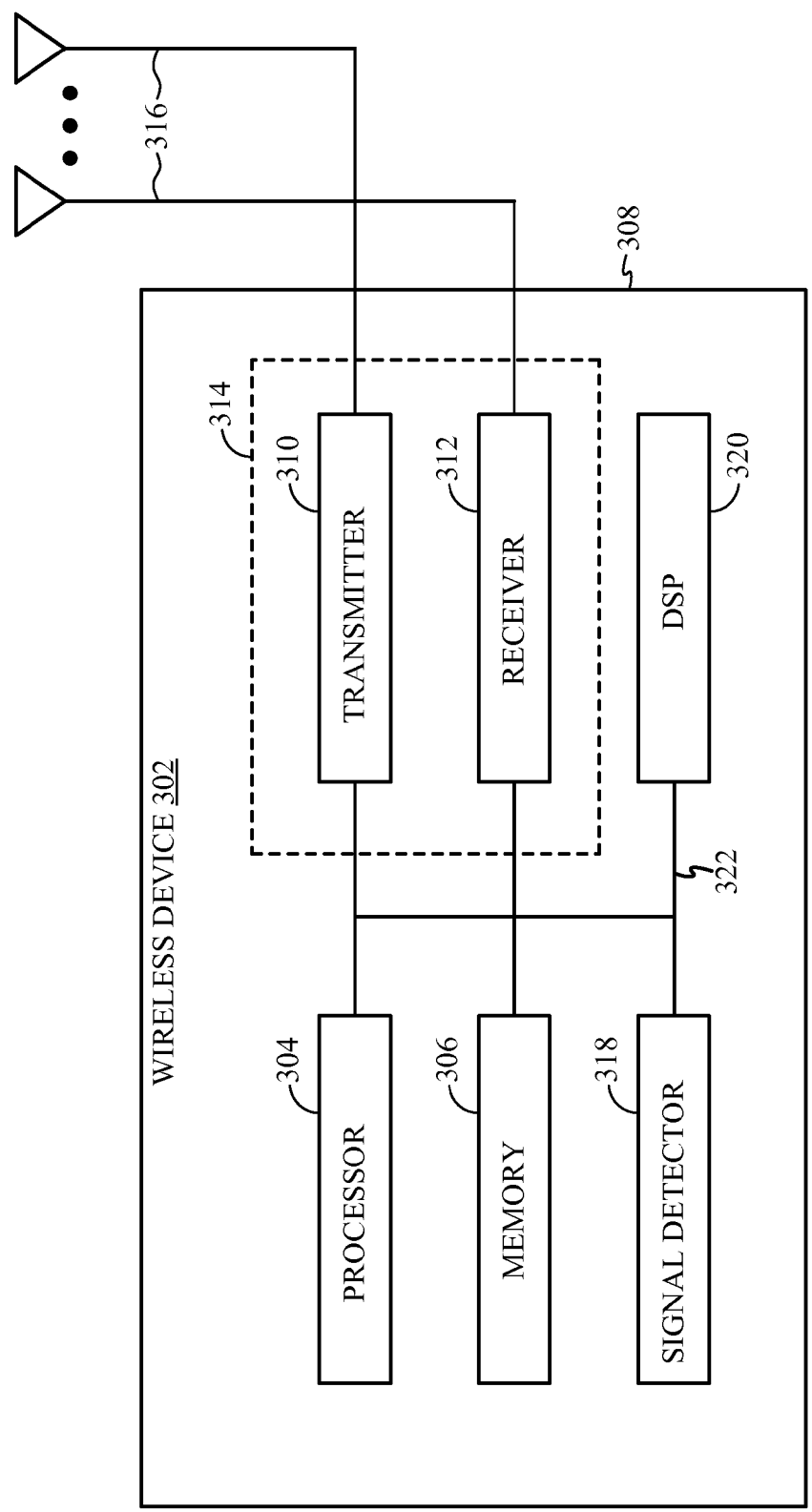
FIG. 3 illustrates a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Short MAC Headers

Counter Mode (CTR) with Cipher-block Chaining Message Authentication Code (CBC-MAC) Protocol (CCMP) is a protocol that can be used to cryptographically protect 802.11 MPDUs. The protection is based on a key that is agreed upon between the communicating wireless devices. Group traffic is protected using a Group Temporal Key (GTK), while unicast traffic is protected using a Pairwise Transient Key (PTK), part of which is a Temporal Key (TK).

Figure 4A:
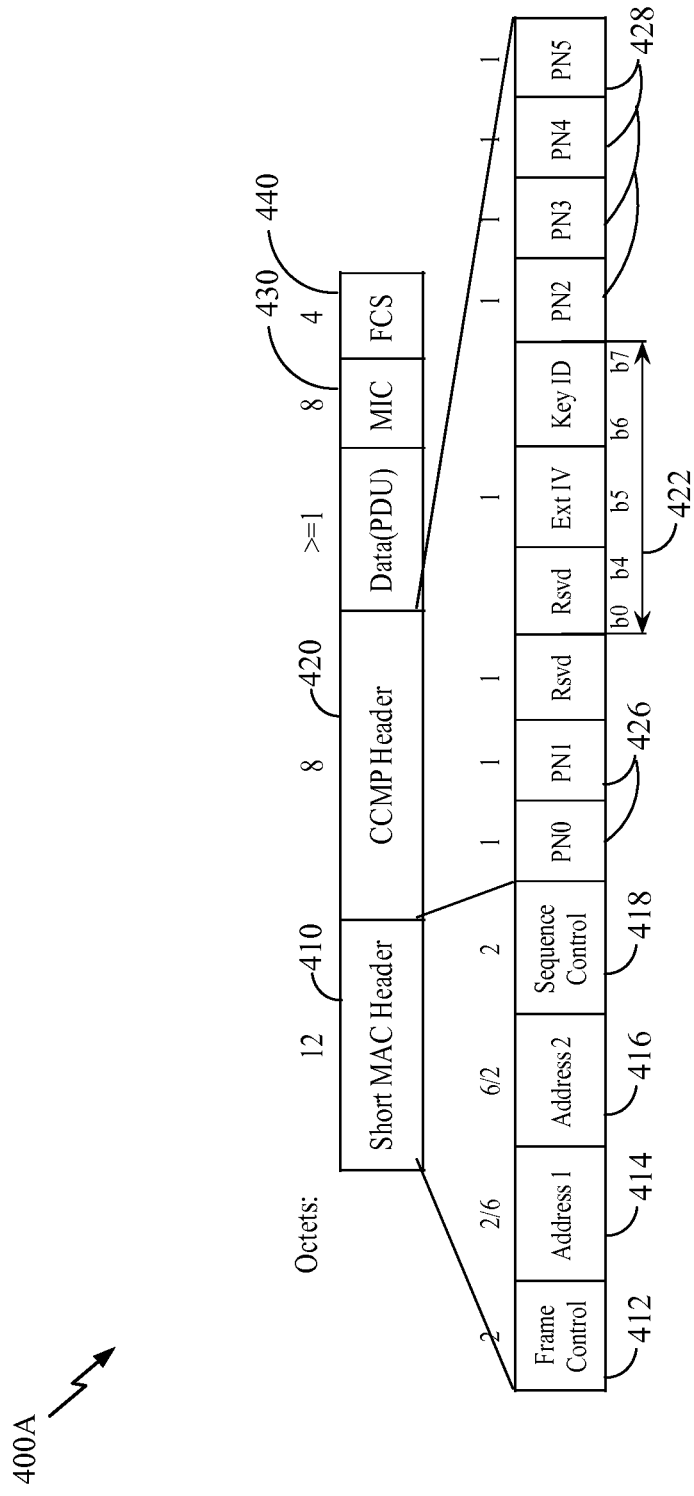
FIG. 4A illustrates an example packet structure utilizing a short MAC header.

FIG. 4A illustrates an example of a packet 400A (e.g., an MPDU) with a short MAC header 410, a CCMP header 420, a Message Integrity Code (MIC) 430 and a frame check sequence (FCS) 440.

As illustrated, the short MAC header 410 may contain a frame control (FC) field 412, destination address 414 and source address 416 of the data packet, and a sequence control field 418. As illustrated, the CCMP header 420 may have a packet number (PN), and a key ID octet 422 with an Ext IV field and a key ID field. As illustrated, the packet number is a 48-bit number stored across 6 octets (as illustrated, the PN codes may be conveyed in the first two octets 426 and last four octets 428 of the CCMP header 420) and are incremented for each subsequent packet.

As illustrated, the Key ID octet 422 may contain the Ext IV field (bit 5), Key ID field (bits 6-7), and a reserved subfield (bits 0-4). This information in the CCMP header 420 may be used to encrypt the data unit and the MIC 430, which protects the integrity and authenticity of the packet. The FCS 440, on the other hand, which is used for error detection and correction, is typically not encrypted.

Implicit Rekeying Mechanism

There are certain scenarios in which a new GTK or PTK needs to be agreed upon between the devices. This procedure is generally referred to as rekeying. The GTK is typically rekeyed by an AP quite frequently for security purposes. Frequent rekeying results in devices that leave a Basic Service Set (BSS), in time, losing their ability to decode group traffic from the BSS. The PTK can also be rekeyed when the Packet Number (PN) space runs out, but this is a less frequent event due to the large size of the PN (6 octets).

In order for rekeying to be a smooth event, each MPDU can indicate one of a number of keys that can be used in parallel. This allows that a new key can be set up while the old key can also still be used for retried packets. The particular key that is used to protect a packet is indicated by the Key Identifier (Key ID). As shown in FIG. 4A, the Key ID is typically included in the MAC header of the packet.

Figure 4B:
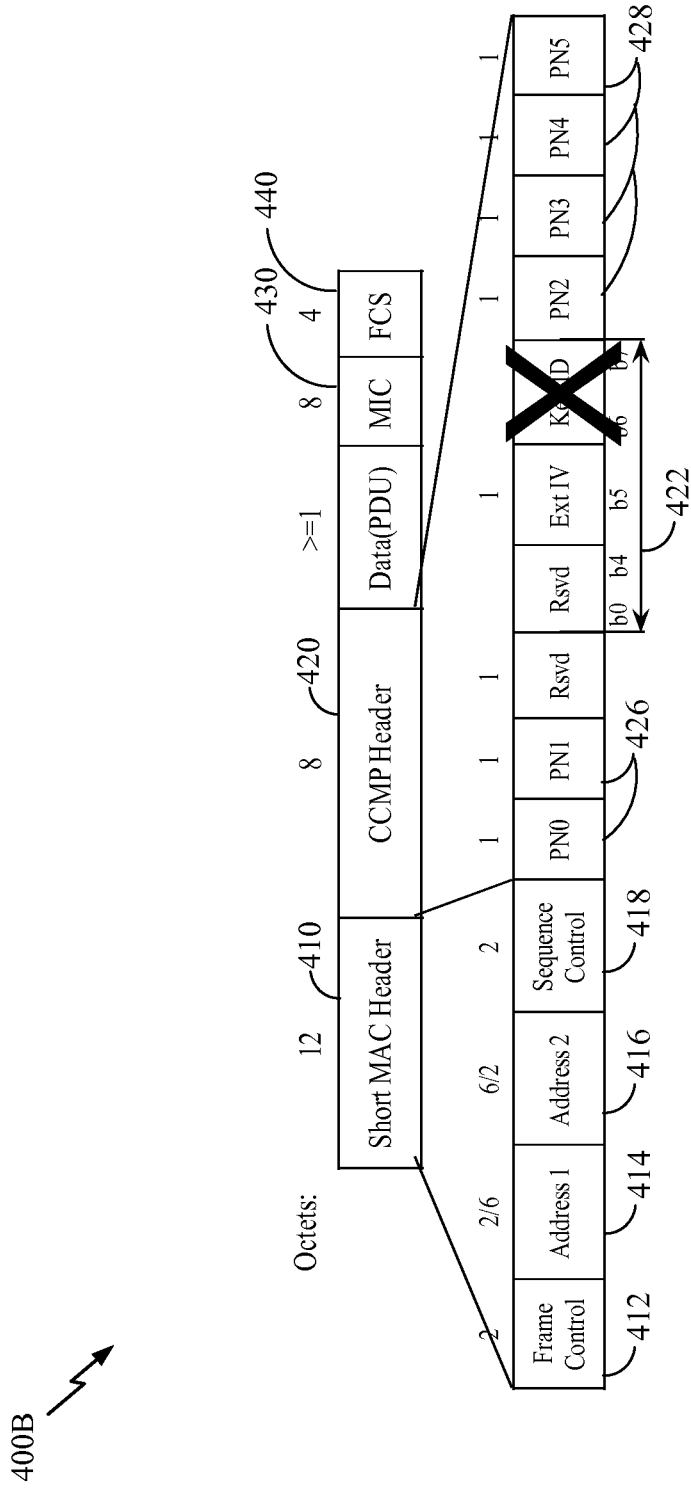
FIG. 4B illustrates an example packet structure utilizing a short MAC header without a Key ID field, in accordance with certain aspects of the present disclosure.

Certain standards (such as 802.11ah) may define frames with a short MAC header, in which the Key ID is no longer present. FIG. 4B illustrates such a frame 400B, with the "X" indicating an omitted Key ID field. The lack of a Key ID field may pose a challenge with respect to key selection and rekeying (e.g., as devices need to know which key to use during rekeying).

In such cases, there may be a need for the transmitting and receiving devices to establish what keys are being used and to allow the establishment of new keys, via a re-keying procedure.

Aspects of the present disclosure provide techniques that allow both transmitting and receiving devices to agree on a default Key ID that may be used for the protection of frames with a short MAC header, and an implicit rekeying procedure is used to switch to a new (fresh) key.

Thus, certain aspects of the present disclosure provide techniques that allow transmitting and receiving devices to agree on a default Key ID that is used for the protection of frames with a short MAC header, and an implicit rekeying procedure is used to switch to a new (fresh) key.

According to certain aspects, the implicit rekeying procedure involves temporarily halting the use of frames (400B) with a short MAC header. During this time, normal frames (e.g., 400A) are sent with the current Key ID. A new key and Key ID are then agreed upon (e.g., using new or existing key handshakes). Once the new key and Key ID have been agreed upon, the default Key ID for frames with a short MAC header becomes the new Key ID (triggered by the successful negotiation of a new key and Key ID), after which the use of frames with a short MAC header (without Key IDs) can be resumed.

Such an implicit rekeying procedure for a PTK (unicast traffic) may be illustrated with the following example. Prior to a re-keying procedure, frames with a short MAC header use a default Key ID for unicast traffic (for example, Key ID 1). At some point, the AP intends to rekey the PTK. From this point on, the AP may halt using frames with short MAC headers and only use normal frames for unicast traffic to the specific destination, still with Key ID 1 (the current PTK).

During the re-keying procedure, the AP exchanges Nonces with the STA for a new pair-wise key, in this example, with Key ID 2. According to certain aspects, the Nonce exchange may implicitly switch the default pairwise key for unicast short headers to Key ID 2. When the Nonce exchange has been performed and the new PTK can be determined by the AP and the STA, the AP switches to the new key. The switch may be indicated, either by using normal unicast frames with Key ID 2 or by resuming the use of frame with a short MAC header (that will now also use Key ID 2).

The implicit rekeying procedure for the GTK (group traffic) is illustrated in the following example. In this example, a default GTK for frames with a short MAC header is Key ID 3 prior to a re-keying procedure. Again, at some point, the AP intends to rekey the GTK. From this point on, the AP uses only normal frames for group traffic, with GTK Key ID 3 (the current GTK).

During the re-keying procedure, the AP performs group key handshakes with all its associated STAs to install GTK Key ID 4 at the STAs (e.g., all the stations targeted by the group transmissions). Each group key handshake implicitly switches the default group key for frames with a short MAC header to the new Key ID 4.

When all group key handshakes have been performed, the AP switches to the new key, either by using normal group frames with Key ID 4 or by using group frames with a short MAC header (that will now also use Key ID 4).

Figure 5:
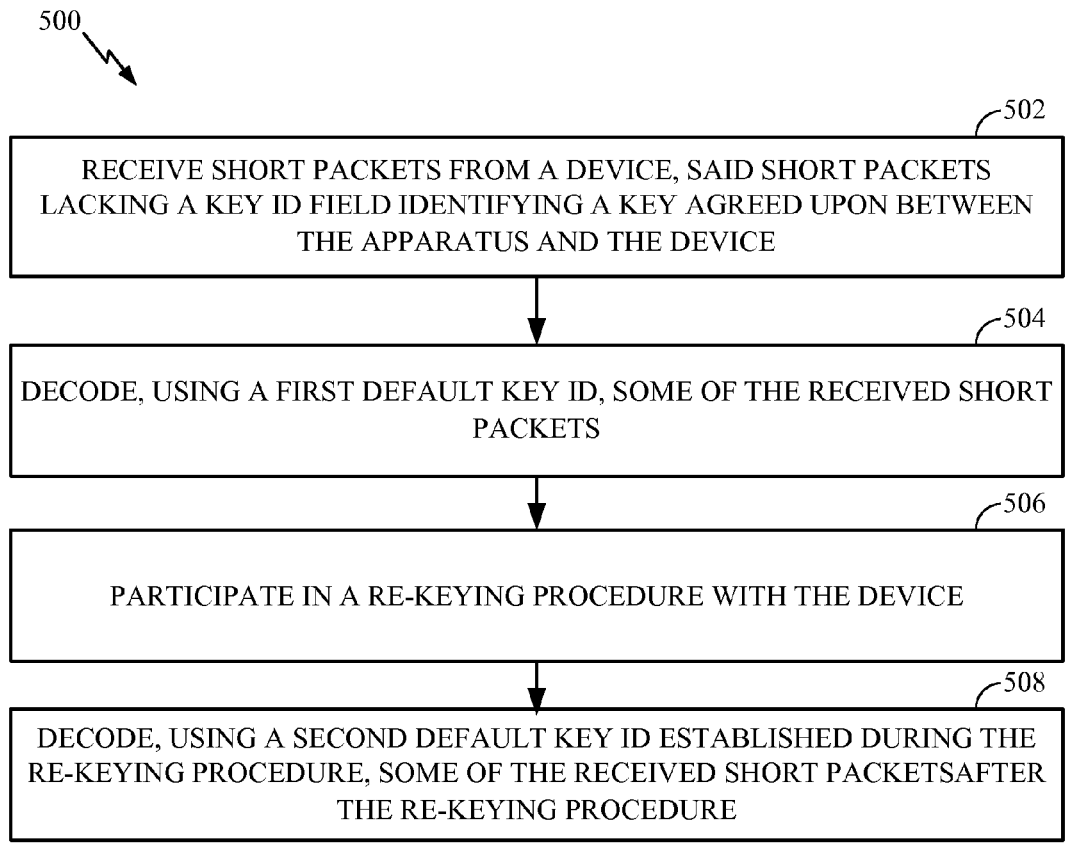
FIG. 5 illustrates a block diagram of example operations for wireless communications by a receiver, in accordance with certain aspects of the present disclosure.

FIG. 5 is a block diagram of example operations 500 for wireless communications by a receiving apparatus, in accordance with aspects of the present disclosure. The operations 500 may be performed by an apparatus, such as a receiving station (RX-STA) involved in a session with an access point (AP).

At 502, the apparatus receives short packets from a device, said short packets lacking a key ID field identifying a key agreed upon between the apparatus and the device. At 504, the apparatus decodes, using a first default key ID, some of the received short packets.

At 506, the apparatus participates in a re-keying procedure with the device. At 508, the apparatus decodes, using a second default key ID established during the re-keying procedure, some of the received short packets after the re-keying procedure.

Figure 6:
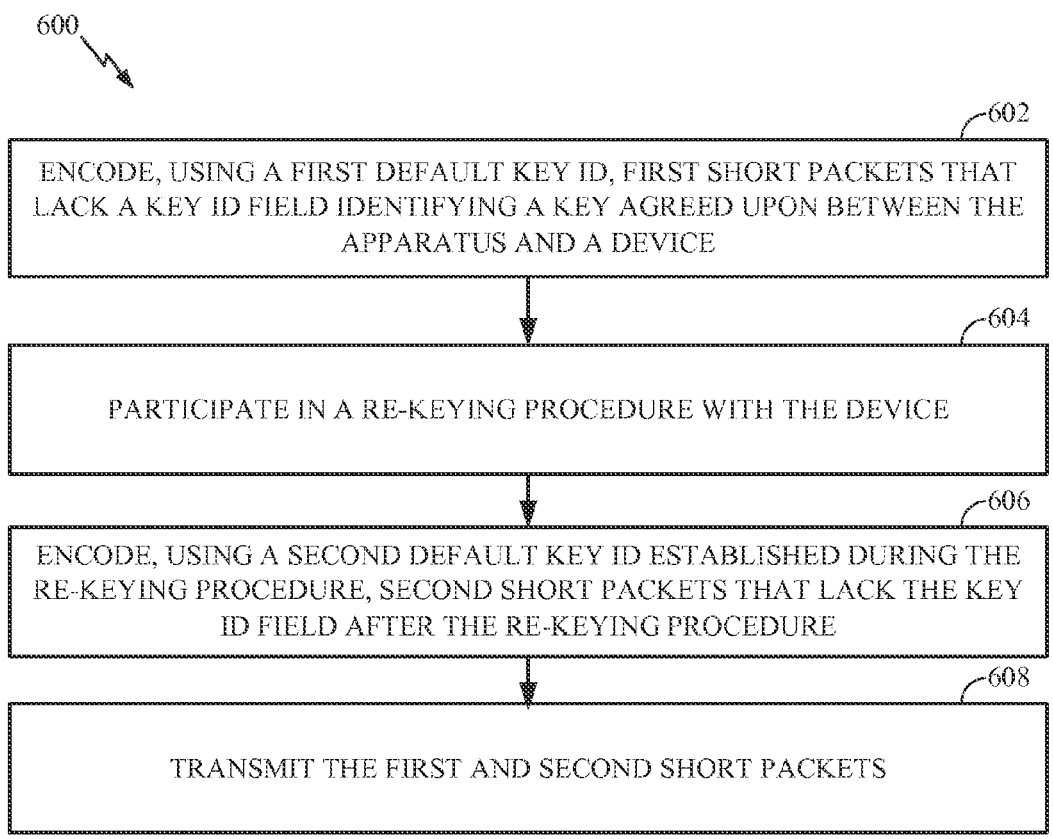
FIG. 6 illustrates a block diagram of example operations for wireless communications by a transmitter, in accordance with certain aspects of the present disclosure.

FIG. 6 is a block diagram of example operations 600 for wireless communications by a transmitting apparatus, in accordance with aspects of the present disclosure. The operations 600 may be performed by a transmitting apparatus, such as an access point involved in a session with a receiving station.

At 602, the apparatus encodes, using a first default key ID, first short packets that lack a key ID field identifying a key agreed upon between the apparatus and a device. At 604, the apparatus participates in a re-keying procedure with the device. At 606, the apparatus encodes, using a second default key ID established during the re-keying procedure, second short packets that lack the key ID field after the re-keying procedure. At 608, the apparatus transmits the first and second short packets.

Figure 5A:
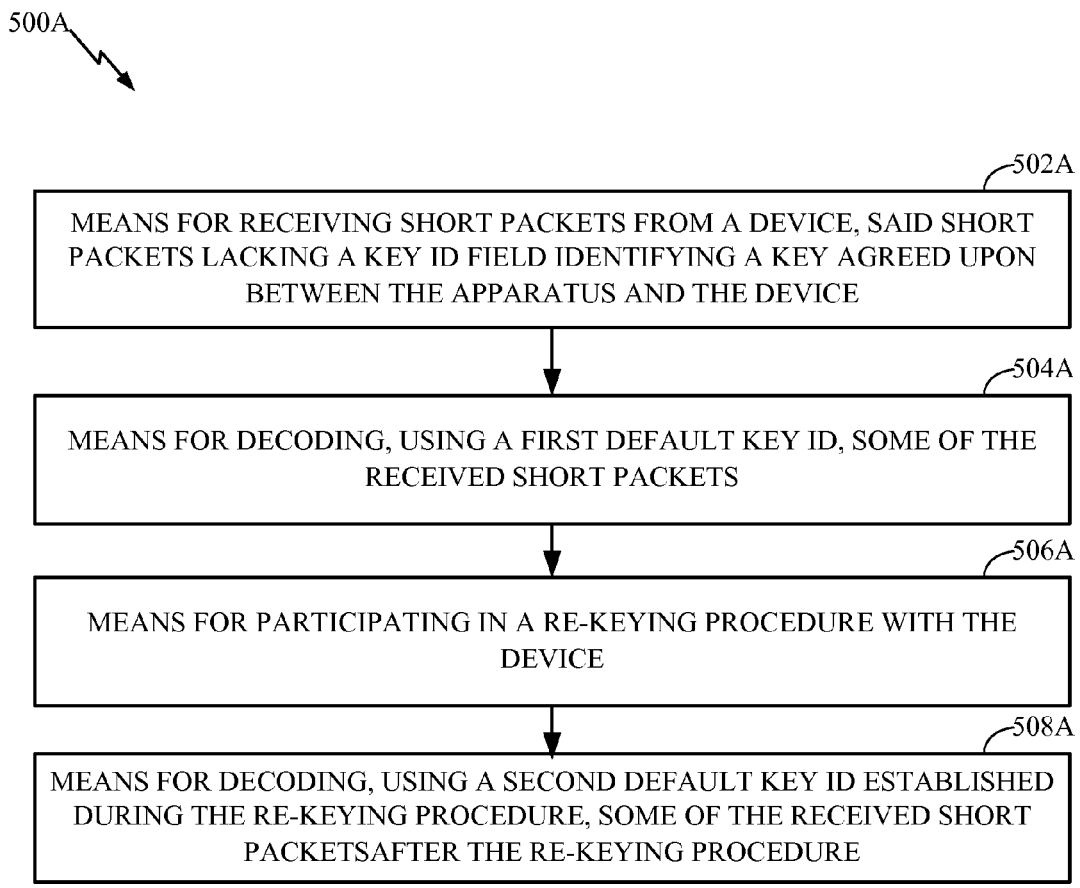
FIG. 5A illustrates example means capable of performing the operations shown in FIG. 5.
Figure 6A:
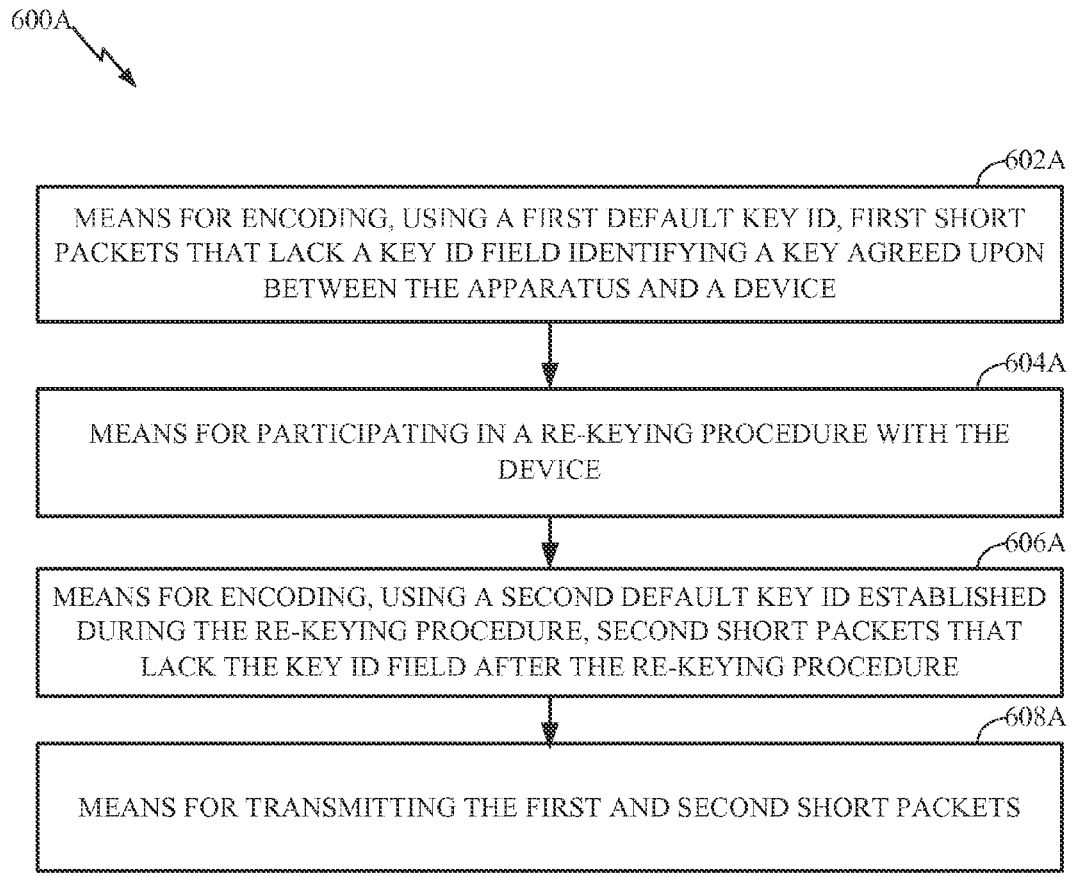
FIG. 6A illustrates example means capable of performing the operations shown in FIG. 6.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 500 and 600 illustrated in FIGS. 5 and 6 correspond to means 500A and 600A illustrated in FIGS. 5A and 6A, respectively.

For example, means for transmitting may comprise a transmitter (e.g., the transmitter unit 222) and/or an antenna(s) 224 of the access point 110 illustrated in FIG. 2 or the transmitter 310 and/or antenna(s) 316 depicted in FIG. 3. Means for receiving may comprise a receiver (e.g., the receiver unit 222) and/or an antenna(s) 224 of the access point 110 illustrated in FIG. 2 or the receiver 312 and/or antenna(s) 316 depicted in FIG. 3. Means for decoding, means for determining, means for indicating, means for participating in a re-keying procedure, or means for encoding may comprise a processing system, which may include one or more processors, such as the RX data processor 242, the TX data processor 210, and/or the controller 230 of the access point 110 illustrated in FIG. 2 or the processor 304 and/or the DSP 320 portrayed in FIG. 3.

According to certain aspects, such means may be implemented by processing systems configured to perform the corresponding functions by implementing various algorithms (e.g., in hardware or by executing software instructions) described above for performing fast association. For example, means for receiving may include receiver units shown in FIGS. 2 and 3, means for decoding may be implemented by a processing system performing an algorithm that receives, as input, a short packet from the receiving means and decodes the short packet using a (previously established) first default key ID, while means for participating in a re-keying procedure may be implemented by a processing system performing an algorithm (e.g., RX processor shown in FIG. 2) to establish a second default key ID for subsequent use. Similarly, means for encoding may be implemented by a processing system (e.g., one of the processors shown in FIG. 2 or 3) performing an algorithm to encode short packets using a first default key ID, and means for transmitting the short packets may be implemented as any of the transmitter units shown in FIG. 2 or 3.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface (in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communications, comprising:
a receiver configured to receive first packets from a device, said first packets lacking a key ID field identifying a first key ID agreed upon between the apparatus and the device and said first packets comprising at least a portion that is encoded using the agreed first key ID; and
a processing system configured to:
decode, using the agreed first key ID, at least one of the received first packets;
participate in a re-keying procedure with the device to agree upon a second key ID, wherein participating in the re-keying procedure comprises:
halting decoding the first packets;
after halting the decoding the first packets:
receiving, via the receiver, second packets from the device that include a key ID field that identifies the agreed first key ID, wherein the second packets comprise at least a portion that is encoded using the agreed first key ID;
decoding, using the agreed first key ID, at least one of the received second packets; and
exchanging handshaking messages with the device to establish the second key ID; and
after establishing the second key ID, halting the decoding of the second packets;
decode, using the established second key ID, at least another of the received first packets after the re-keying procedure; and
process data associated with the decoded first packets.

2. The apparatus of claim 1, wherein the processing system is further configured to determine the re-keying procedure is complete after receiving, via the receiver, third packets that lack a key ID field.

3. The apparatus of claim 1, wherein the processing system is further configured to determine the re-keying procedure is complete after receiving, via the receiver, a fourth packet including a key ID field that identifies the second key ID.

4. An apparatus for wireless communications, comprising:
a transmitter; and
a processing system configured to:
encode at least a first packet that lacks a key ID field identifying a first key ID agreed upon between the apparatus and a device using the agreed first key ID, wherein the encoded first packet comprises at least a portion that is encoded using the agreed first key ID;

participate in a re-keying procedure with the device to agree upon a second key ID, wherein participating in the re-keying procedure comprises:

halting encoding the first packets;

after halting the encoding of the first packets:

encoding at least a second packet that includes a key ID field that identifies the agreed first key ID, wherein the encoded second packet comprises at least a portion that is encoded using the agreed first key ID;

transmitting, via the transmitter, the encoded second packet to the device; and exchanging handshaking messages with the device to establish the second key ID; and after establishing the second key ID, halting the encoding of the second packets;

encode at least a third packet that lacks a key ID field identifying the established second key ID, wherein the encoded third packet comprises at least a portion that is encoded using the established second key ID; and wherein the transmitter is configured to transmit the encoded first packet and the encoded third packet to the device.

5. The apparatus of claim 4, wherein the processing system is further configured to indicate the re-keying procedure is complete by transmitting, via the transmitter, the third packet that lacks a key ID field.

6. The apparatus of claim 4, wherein the processing system is further configured to indicate the re-keying procedure is complete by transmitting, via the transmitter, a fourth packet including a key ID field that identifies the second key ID.

7. The apparatus of claim 4, wherein:
the encoded first packet and the encoded third packet are encoded using a Pairwise Transient Key (PTK).

8. The apparatus of claim 4, wherein:
the encoded first packet and the encoded third packet are encoded using a Group Temporal Key (GTK).

9. A method for wireless communications by an apparatus, comprising:

receiving first packets from a device, said first packets lacking a key ID field identifying a first key ID agreed upon between the apparatus and the device and said first packets comprising at least a portion that is encoded using the agreed first key ID;

decoding, using the agreed first key ID, at least one of the received first packets;

participating in a re-keying procedure with the device to agree upon a second key ID, wherein participating in the re-keying procedure comprises:

halting decoding the first packets;

after halting the decoding of the first packets:

receiving second packets from the device that include a key ID field that identifies the agreed first key ID, wherein the second packets comprise at least a portion that is encoded using the agreed first key ID;

decoding, using the agreed first key ID, at least one of the received second packets; and exchanging handshaking messages with the device to establish the second key ID; and after establishing the second key ID, halting the decoding of the second packets;

decoding, using the established second key ID, at least another of the received first packets after the re-keying procedure; and processing data associated with the decoded first packets.

10. The method of claim 9, further comprising determining the re-keying procedure is complete after receiving third packets that lack a key ID field.

11. The method of claim 9, further comprising determining the re-keying procedure is complete after receiving a fourth packet including a key ID field that identifies the second key ID.

12. A method for wireless communications by an apparatus, comprising:

encoding at least a first packet that lacks a key ID field identifying a first key ID agreed upon between the apparatus and a device using the agreed first key ID, wherein the encoded first packet comprises at least a portion that is encoded using the agreed first key ID;

participating in a re-keying procedure with the device to agree upon a second key ID, wherein participating in the re-keying procedure comprises:

halting encoding the first packets;

after halting the encoding of the first packets:

encoding at least a second packet that includes a key ID field that identifies the agreed first key ID, wherein the encoded second packet comprises at least a portion that is encoded using the agreed first key ID, transmitting the encoded second packet to the device; and exchanging handshaking messages with the device to establish the second key ID; and after establishing the second key ID, halting the encoding of the second packets;

encoding, at least a third packet that lacks a key ID field identifying the established second key ID, wherein the encoded third packet comprises at least a portion that is encoded using the established second key ID; and transmitting the encoded first packet and the encoded third packet to the device.

13. The method of claim 12, further comprising indicating the re-keying procedure is complete by transmitting the third packet that lacks a key ID field.

14. The method of claim 12, further comprising indicating the re-keying procedure is complete by transmitting a fourth packet including a key ID field that identifies the second key ID.

15. The method of claim 12, wherein:
the encoded first packet and the encoded third packet are encoded using a Pairwise Transient Key (PTK).

16. The method of claim 12, wherein:
the encoded first packet and the encoded third packet are encoded using a Group Temporal Key (GTK).

17. The apparatus of claim 1, wherein the first packets comprise medium access control (MAC) protocol data units (MPDUs) comprising at least a short MAC header and a short Counter Mode Cipher Block Chaining Message Authentication Code Protocol (CCMP) header.

18. The apparatus of claim 4, wherein the first packets comprise medium access control (MAC) protocol data units (MPDUs) comprising at least a short MAC header and a short Counter Mode Cipher Block Chaining Message Authentication Code Protocol (CCMP) header.

19. The method of claim 9, wherein the first packets comprise medium access control (MAC) protocol data units (MPDUs) comprising at least a short MAC header and a short Counter Mode Cipher Block Chaining Message Authentication Code Protocol (CCMP) header.

20. The method of claim 12, wherein the first packets comprise medium access control (MAC) protocol data units (MPDUs) comprising at least a short MAC header and a short Counter Mode Cipher Block Chaining Message Authentication Code Protocol (CCMP) header.

21. A non-transitory computer-readable medium storing computer executable code, comprising:
code for receiving, at an apparatus, first packets from a device, said first packets lacking a key ID field identifying a first key ID agreed upon between the apparatus and the device and said first packets comprising at least a portion that is encoded using the agreed first key ID;
code for decoding, using the agreed first key ID, at least one of the received first packets;
code for participating in a re-keying procedure with the device to agree upon a second key ID, wherein participating in the re-keying procedure comprises:
halting decoding the first packets;
after halting the decoding of the first packets:
receiving second packets from the device that include a key ID field that identifies the agreed first key ID, wherein the second packets comprise at least a portion that is encoded using the agreed first key ID;
decoding, using the agreed first key ID, at least one of the received second packets; and
exchanging handshaking messages with the device to establish the second key ID; and
after establishing the second key ID, halting the decoding of the second packets;
code for decoding, using the established second key ID, at least another of the received first packets after the re-keying procedure; and
code for processing data associated with the decoded first packets.

22. A non-transitory computer-readable medium storing computer executable code, comprising:
code for encoding, by an apparatus, at least a first packet that lacks a key ID field identifying a first key ID agreed upon between the apparatus and a device using the agreed first key ID, wherein the encoded first packet comprises at least a portion that is encoded using the agreed first key ID;
code for participating in a re-keying procedure with the device to agree upon a second key ID, wherein participating in the re-keying procedure comprises:
halting encoding the first packets;
after halting the encoding of the first packets:
encoding at least a second packet that includes a key ID field that identifies the agreed first key ID, wherein the encoded second packet comprises at least a portion that is encoded using the agreed first key ID;
transmitting the encoded second packet to the device; and
exchanging handshaking messages with the device to establish the second key ID; and
after establishing the second key ID, halting the encoding of the second packets;
code for encoding at least a third packet that lacks a key ID field identifying the established second key ID, wherein the encoded third packet comprises at least a portion that is encoded using the established second key ID; and
code for transmitting the encoded first packet and the encoded third packet to the device.

23. A station, comprising:
at least one antenna;
a receiver configured to receive, via the at least one antenna, first packets from a device, said first packets lacking a key ID field identifying a first key ID agreed upon between the station and the device and said first packets comprising at least a portion that is encoded using the agreed first key ID; and
a processing system configured to:
decode, using the agreed first key ID, at least one of the received first packets;
participate in a re-keying procedure with the device to agree upon a second key ID, wherein participating in the re-keying procedure comprises:
halting decoding the first packets;
after halting the decoding of the first packets:
receiving, via the receiver, second packets from the device that include a key ID field that identifies the agreed first key ID, wherein the second packets comprise at least a portion that is encoded using the agreed first key ID;
decoding, using the agreed first key ID, at least one of the received second packets; and
exchanging handshaking messages with the device to establish the second key ID; and
after establishing the second key ID, halting the decoding of the second packets;
decode, using the established second key ID, at least another of the received first packets after the re-keying procedure; and
process data associated with the decoded first packets.

24. An access point (AP), comprising:
at least one antenna;
a transmitter; and
a processing system configured to:
encode at least a first packet that lacks a key ID field identifying a first key ID agreed upon between the AP and a device using the agreed first key ID, wherein the encoded first packet comprises at least a portion that is encoded using the agreed first key ID;
participate in a re-keying procedure with the device to agree upon a second key ID, wherein participating in the re-keying procedure comprises:
halting encoding the first packets;
after halting the encoding of the first packets:
encoding at least a second packet that includes a key ID field that identifies the agreed first key ID, wherein the encoded second packet comprises at least a portion that is encoded using the agreed first key ID;
transmitting, via the transmitter, the encoded second packet to the device; and
exchanging handshaking messages with the device to establish the second key ID; and
after establishing the second key ID, halting the encoding of the second packets;
encode, at least a third packet that lacks a key ID field identifying the established second key ID, wherein the encoded third packet comprises at least a portion that is encoded using the established second key ID; and
wherein the transmitter is configured to transmit, via the at least one antenna, the encoded first packet and the encoded third packet to the device.

\* \* \* \* \*